(12) United States Patent
Doubleday et al.

(10) Patent No.: US 8,913,088 B2
(45) Date of Patent: Dec. 16, 2014

(54) ADJUSTING DISPLAYED CONTENT LENGTH AS A FUNCTION OF MAP SCALE

(71) Applicant: Google Inc., Mountain View, CA (US)

(72) Inventors: Alan Gordon Doubleday, Macquarie Park (AU); Jordan J. Bayliss-McCulloch, Beaconsfield (AU); Alexander M. Berry, Pyrmont (AU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/863,325

(22) Filed: Apr. 15, 2013

(65) Prior Publication Data

US 2014/0306989 A1    Oct. 16, 2014

(51) Int. Cl.
   *G06Q 30/02*     (2012.01)
   *G06T 11/60*     (2006.01)

(52) U.S. Cl.
   CPC ..................................... *G06T 11/60* (2013.01)
   USPC .......................................................... 345/660

(58) Field of Classification Search
   USPC .......................................................... 345/661
   See application file for complete search history.

(56) References Cited

U.S. PATENT DOCUMENTS

| | | | |
|---|---|---|---|
| 5,553,209 A | 9/1996 | Johnson et al. | |
| 7,894,984 B2 * | 2/2011 | Rasmussen et al. | 701/452 |
| 7,916,157 B1 * | 3/2011 | Kelley et al. | 345/660 |
| 8,319,772 B2 | 11/2012 | Fong et al. | |
| 2008/0082397 A1 * | 4/2008 | Dennison et al. | 705/10 |
| 2009/0198607 A1 | 8/2009 | Badger et al. | |
| 2011/0055024 A1 * | 3/2011 | Shen | 705/14.72 |
| 2013/0038635 A1 | 2/2013 | Bales et al. | |
| 2013/0093787 A1 * | 4/2013 | Fulks et al. | 345/629 |
| 2014/0068549 A1 * | 3/2014 | Friedman et al. | 717/104 |
| 2014/0095328 A1 * | 4/2014 | Forouzandeh et al. | 705/14.73 |

\* cited by examiner

*Primary Examiner* — David Zarka
*Assistant Examiner* — Richard M Russell
(74) *Attorney, Agent, or Firm* — McDermott Will & Emery LLP (57) ABSTRACT

A system for adjusting displayed content length as a function of map scale may include one or more computing devices and a memory. The one or more computing devices may receive a query, retrieve a content item based at least in part on the query. The one or more computing devices may further determine a first amount of the content item to display based at least in part on a first zoom level, determine a second amount of the retrieved content item to display based at least in part on a second zoom level and provide the map to the user device for display, where the first amount of the content item is overlaid on the map when the map is displayed at the first zoom level and the second amount of the content item is overlaid on the map when the map is displayed at the second zoom level.

20 Claims, 7 Drawing Sheets

ADJUSTING DISPLAYED CONTENT LENGTH AS A FUNCTION OF MAP SCALE

TECHNICAL FIELD

The present description relates generally to adjusting displayed content length, and more particularly, but not exclusively, to adjusting displayed content length as a function of map scale.

BACKGROUND

In online advertising systems, advertisements are presented to users on web pages, such as on geographical map pages. If a user clicks on an advertisement on a web page, and/or performs some other action subsequent to clicking on an advertisement, the operator of the web page may be compensated, such as by the entity or business associated with the advertisement. In some instances, the likelihood of a user clicking on an advertisement may be influenced by the manner in which the advertisement is presented to the user. Thus, it may be desirable for web page operators, such as geographical map providers, to present advertisements to users in a manner that increases the likelihood that the users will click on one of the presented advertisements.

SUMMARY

The disclosed subject matter relates to a computer implemented method for adjusting displayed content length as a function of map scale. The method may include receiving, using one or more computing devices, a query from a user device, retrieving, using the one or more computing devices, a content item based at least in part on the query, determining, using the one or more computing devices, a first amount of the retrieved content item to display based at least in part on a first zoom level, determining, using the one or more computing devices, a second amount of the retrieved content item to display based at least in part on a second zoom level, wherein the second zoom level is unequal to the first zoom level, and the second amount of the content item is unequal to the first amount of the content item, and providing, using the one or more computing devices and to the user device, the map for display, wherein the first amount of the content item is overlaid on the map when the map is displayed at the first zoom level and the second amount of the content item is overlaid on the map when the map is displayed at the second zoom level.

The disclosed subject matter also relates to a computer implemented method for adjusting displayed content length as a function of map scale. The method may include receiving, using one or more computing devices, a geographic search query, retrieving, using the one or more computing devices, an advertisement and a map both being retrieved based at least in part on the geographic search query, wherein the advertisement is associated with a geographic location that is encompassed by the map, and the advertisement comprises text, determining, using the one or more computing devices, an amount of the text of the advertisement to display based at least in part on a zoom level of the map, wherein the amount of the text of the advertisement to display increases proportionally to zooming in on the map until an entire amount of the text of the advertisement is displayed or a maximum zoomed in level is reached, and providing, using the one or more computing devices, a map that includes the determined amount of the text of the advertisement overlaid on the map at a position that is proximal to the geographic location associated with the advertisement.

The disclosed subject matter also relates to a system that includes one or more computing devices and a memory including instructions that, when executed by the one or more computing devices, cause the one or more computing devices to: receive a query, retrieve an advertisement based at least in part on the query, wherein the advertisement is associated with a geographic location and the advertisement comprises text; and provide an interactive map interface, the interactive map interface displaying: a map that comprises a geographic area that encompasses the geographic location, wherein an amount of the advertisement is overlaid on the map at a position that is proximal to the geographic location, wherein the interactive map interface is configured to change a scale of the map in response to a user interaction with the interactive map interface and change the amount of the advertisement that is displayed on the map as a function of the scale of the map.

The disclosed subject matter also relates to a non-transitory machine-readable medium embodying instructions that, when executed by a machine, allow the machine to perform a method for adjusting a length of displayed content as a function of map scale. The method may include receiving a search query, retrieving an advertisement and a map based at least in part on the search query, wherein the advertisement is associated with a geographic location that is encompassed by the map and the advertisement comprises text, determining a number of pixels of the map that are allocated to an advertisement box as a first function of a zoom level of the map, determining an amount of text of the advertisement to overlay on the map as a second function of the number of pixels of the map that are allocated to the advertisement box, and providing the map for display, wherein the determined number of pixels of the map comprise the advertisement box and the advertisement box comprises the determined amount of text of the advertisement.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In some instances, structures and components are shown in block diagram form in order to avoid obscuring the concepts of the subject technology.

I. Overview

In the subject system for adjusting displayed content length as a function of map scale, a content item, such as an advertisement, is received for display on a map, and the amount of the content item that is displayed is determined based at least in part on the scale of the map, e.g. the zoom level of the map. The subject system may adjust the amount, or length, of the content item that is displayed on the map in response to a user zooming in or zooming out of the map. For example, as a user zooms in on the map, e.g. the map scale increases, the amount of the content item that is displayed on the map increases, and as a user zooms out of the map, e.g. the map scale decreases, the amount of the content item that is displayed on the map decreases. However, the subject system may display a minimum amount of the content item on the map irrespective of the zoom level of the map, e.g. once the displayed amount of the content item has been reduced to a minimum amount, the displayed amount of the content item does not decrease further as the map is further zoomed out, e.g. the displayed amount remains constant as the map is further zoomed out. Thus, as the user zooms in on the map, and additional on-map space becomes available, the amount of the content item that is displayed on the map increases to take advantage of the additional on-map space.

The phrase "zoom level" as used herein encompasses its plain and ordinary meaning and, if not otherwise included in its plain and ordinary meaning, may also refer an index that indicates an amount that a map has been zoomed into or zoomed out of, e.g. from an initial zoom level or from a maximum zoom level. For example, the zoom level may have an initial value, e.g. an initial zoom level, which may refer to the zoom level that a map is initially displayed at, e.g. before the map is zoomed in or zoomed out. Alternatively, or in addition, the zoom level may have a configurable maximum value, e.g. a maximum zoom level, which may refer to the maximum amount that the map can be zoomed in, or the maximum amount that the map can be zoomed out. In one or more implementations, the maximum amount that the map can be zoomed in may be referred to as a maximum zoomed in level, while the maximum amount that the map can be zoomed out may be referred to as a maximum zoomed out level.

In one or more implementations, in response to receiving a geographic search query from a user, the subject system may retrieve geographic search results and may provide a map to the user that includes the geographic search results. The map may be displayed to the user at an initial zoom level that may be determined, e.g. based at least in part on geographic locations that are associated with the geographic search results. For example, the initial zoom level of the map may be selected such that a certain number of the geographic search results are viewable at their corresponding geographic locations on the map, such as ten search results. The subject system may then retrieve at least one advertisement that is associated with a geographic location based at least in part on the geographic search query. The advertisement may include text, images, video, or generally any content; however, for explanatory purposes, the advertisement is generally described herein as including text. The text of the advertisement may be overlaid on the map at a position that is proximal to the geographic location that is associated with the advertisement. In one or more implementations, the font size of the text may remain constant irrespective of the zoom level of the map; however, the amount of the text of the advertisement that is displayed on the map may be determined as a function of the zoom level of the map.

The phrase "geographic search query" as used herein encompasses its plain and ordinary meaning and, if not otherwise included in its plain and ordinary meaning, may also refer to a search query that has a geographic context or a search query from which a geographic context is determinable, such as based at least in part on a geographic area of a map being displayed to a user when the search query is submitted.

For example, at the initial zoom level, less than an entirety of the text of the advertisement may be displayed on the map. Thus, the text of the advertisement is truncated, or shortened, when the advertisement is displayed on the map at the initial zoom level. In one or more implementations, the amount of the text of the advertisement that is displayed on the map at the initial zoom level may be the minimum amount of the text of the advertisement that is displayed on the map irrespective of the zoom level. In other words, if the map is zoomed out from the initial zoom level, the amount of text of the advertisement that is displayed on the map may remain constant. However, if the map is zoomed in from the initial zoom level, the amount of text that is displayed on the map increases until the zoom level reaches a maximum zoomed in level, or until the entirety of the advertisement is displayed on the map. In one or more implementations, the entirety of the advertisement may not be displayed at the maximum zoomed in level, e.g. the text of the advertisement may be truncated or shortened even at the maximum zoomed in level.

In one or more implementations, if the entirety of the advertisement is displayed on the map when the map is zoomed in less than the maximum zoomed in level, then the subject system may begin to display, as the map is zoomed in further, additional information related to a business that is associated with the advertisement. The additional information may include a name of the business, a street address of a physical location of the business, a network identifier (e.g., uniform resource locator) of the business, a phone number of the business, user review information for the business, or generally any information that is related to the business.

In one or more implementations, the text of the advertisement may be displayed on the map in an advertisement box that is proximal to the geographic location that is associated with the advertisement. The subject system may allocate different number of pixels on the map to the advertisement box for each zoom level, e.g. the number of pixels allocated to the advertisement box may increase as the map is zoomed in, and the number of pixels may decrease as the map is zoomed out until the number of pixels has been decreased to a minimum number of pixels, e.g. the minimum number of pixels that are allocated to the advertisement box irrespective of the zoom level. The amount of text of the advertisement that is displayed in the advertisement box for a zoom level may be determined based at least in part on the number of whole words of the text of the advertisement that can fit within the number of pixels allocated to the advertisement box for the zoom level. In other words, in one or more implementations the text of the advertisement is truncated, as necessary, at word breaks within the text of the advertisement. Thus, in one or more implementations, the number of pixels of the map that are allocated to the advertisement box may be a function of the scale of the map, while the amount of text of the advertisement that is displayed on the map may be a function of the number of pixels that are allocated to the advertisement box.

In one or more implementations, the text of the advertisement may be displayed across a single line of the advertisement box, e.g. at the initial zoom level of the map. However, once the map is zoomed in to a zoom level that satisfies a multi-line zoom level threshold, the text of the advertisement may be spread across at least two lines of the advertisement box. Similarly, if the map is zoomed out to a zoom level that does not satisfy the multi-line zoom level threshold, the text of the advertisement may be consolidated to a single line of the advertisement box. The multi-line zoom level threshold may be between the initial zoom level and the maximum zoomed in level, such as half-way between the initial zoom level and the maximum zoomed in level. The subject system may utilize multiple different zoom level thresholds to determine the number of lines of the advertisement box that the text of the advertisement should be spread across. For example, when the map is zoomed into a zoom level that satisfies an n-line zoom level threshold, the text of the advertisement may be spread across n-lines of the advertisement box.

In one or more implementations, the subject system may be encoded as part of an interactive map interface that is provided by a server device to a client device. For example, the server device may provide the client device with an interactive map interface that displays the map, the overlaid search results, and any overlaid advertisements. The interactive map interface may be configured by the server device to change the zoom level of the map, e.g. in response to a user interaction, and may further be configured by the server device to change the amount of the advertisement that is overlaid on the map as a function of the zoom level of the map. In one or more implementations, the service device may provide the entire text of an advertisement and the interactive map interface may determine the amount of text of the advertisement to display based at least in part on the zoom level of the map. Alternatively, or in addition, the server device may provide the entire text of the advertisement along with indications of the amount of the text of the advertisement that should be displayed at each zoom level.

Figure 1:
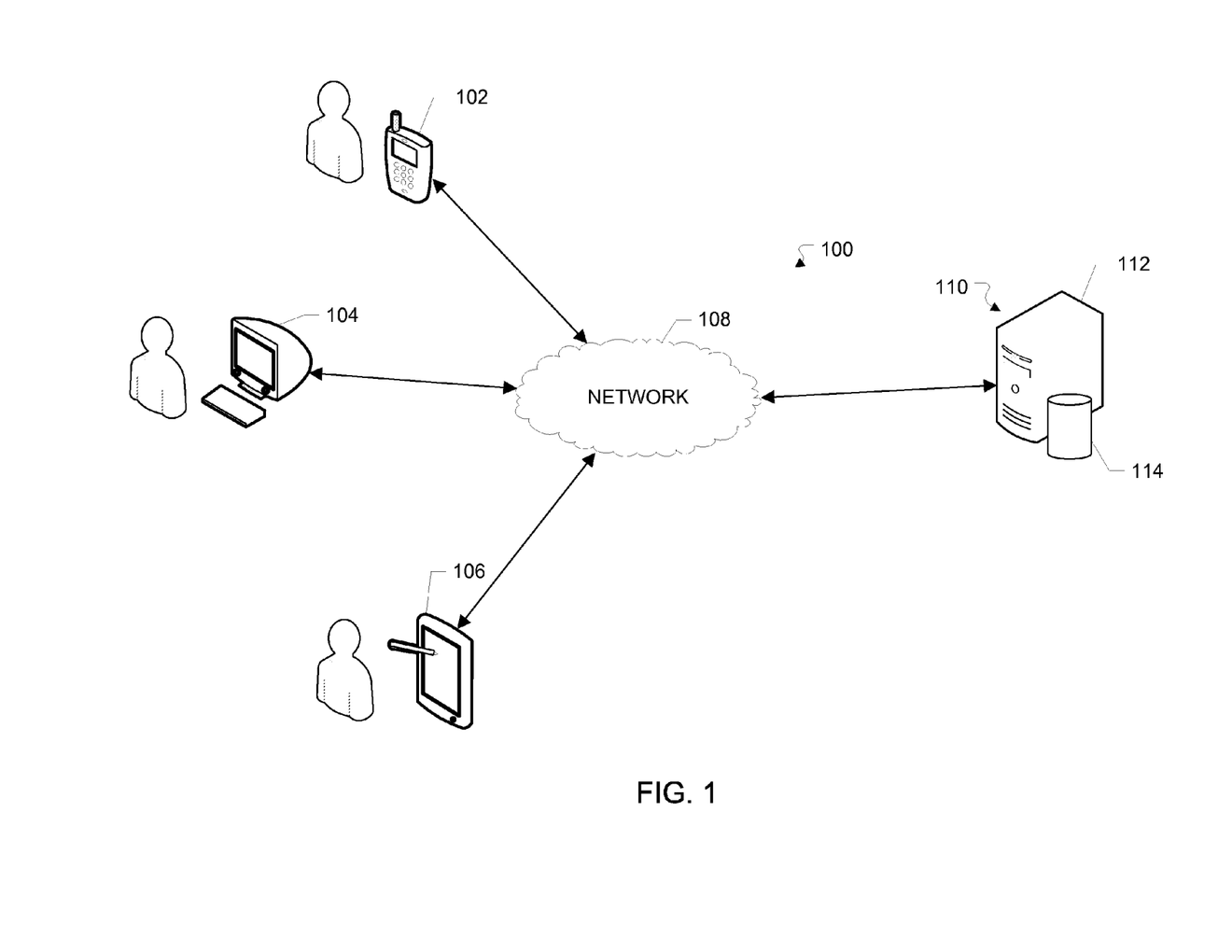
FIG. 1 illustrates an example network environment that may implement a system for adjusting displayed content length as a function of map scale in accordance with one or more implementations.

II. Example Network Environments for Systems for Adjusting Displayed Content Length as a Function of Map Scale FIG. 1 illustrates an example network environment 100 which may implement a system for adjusting displayed content length as a function of map scale in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The network environment 100 may include a number of electronic devices 102, 104, 106 communicably connected to a server 110, such as by the network 108. In another example, some or all of the electronic devices 102, 104, 106 may be communicably connected to one another, such as by the network 108, and some or all of the electronic devices 102, 104, 106 may not be communicably connected to the server 110. The network 108 may be a public communication network (such as the Internet, cellular data network, dialup modems over a telephone network) or a private communications network (such as private local area network ("LAN"), leased lines). The network 108 may also include, but is not limited to, any one or more of the following network topologies, including a bus network, a star network, a ring network, a mesh network, a star-bus network, a tree or hierarchical network, and the like.

In some example embodiments, the electronic devices 102, 104 and 106 can be computing devices such as laptop or desktop computers, smartphones, personal digital assistants ("PDAs"), portable media players, tablet computers, televisions or other displays with one or more processors coupled thereto and/or embedded therein, or other appropriate computing devices that can be used for displaying a web page or web application, such as a web page or a web application that displays content items on a map. In the example of FIG. 1, the electronic device 102 is depicted as a smartphone, the electronic device 104 is depicted as a desktop computer, and the electronic device 106 is depicted as a tablet device.

In one example, server 110 may be a single computing device such as a computer server. In another example, server 110 may represent one or more computing devices (such as a cloud of computers and/or a distributed system) that are communicatively coupled, such as communicatively coupled over the network 108, that collectively, or individually, perform one or more functions that can be performed server-side, such as search result retrieval, advertising content retrieval, map generation/retrieval, advertising content serving, and/or generally any functions that can be performed server-side. The one or more computing devices of the server 110 may be geographically collocated and/or the one or more computing devices of the server 110 may be disparately located. The server 110 may be coupled with various databases, storage services, or other computing devices. The server 110, and the coupled databases, storage services, or other computing devices may be geographically collocated, or may be disparately located.

In one or more implementations, the server 110 includes a processing device 112 and a data store 114. The processing device 112 executes computer instructions stored in the data store 114, for example, to adjust displayed content length as a function of map scale. In one or more implementations, the data store 114 may store the computer instructions on non-transitory computer-readable medium.

The server 110 may host a web server that is communicatively coupled to client devices, such as web browsers of client devices (e.g., electronic devices 102, 104 or 106) via network 108. In one example, the subject system may be integrated into one or more of a search engine, a map engine, an advertising content retrieval system and/or an advertising content serving system hosted at server 110. In another example, the subject system may be hosted at server 110 and may be communicatively coupled to one or more remote servers hosting one or more other search engines, map engines, advertising content retrieval systems and/or advertising content serving systems (e.g., one or more remote servers) over one or more networks (e.g., network 108).

Figure 2:
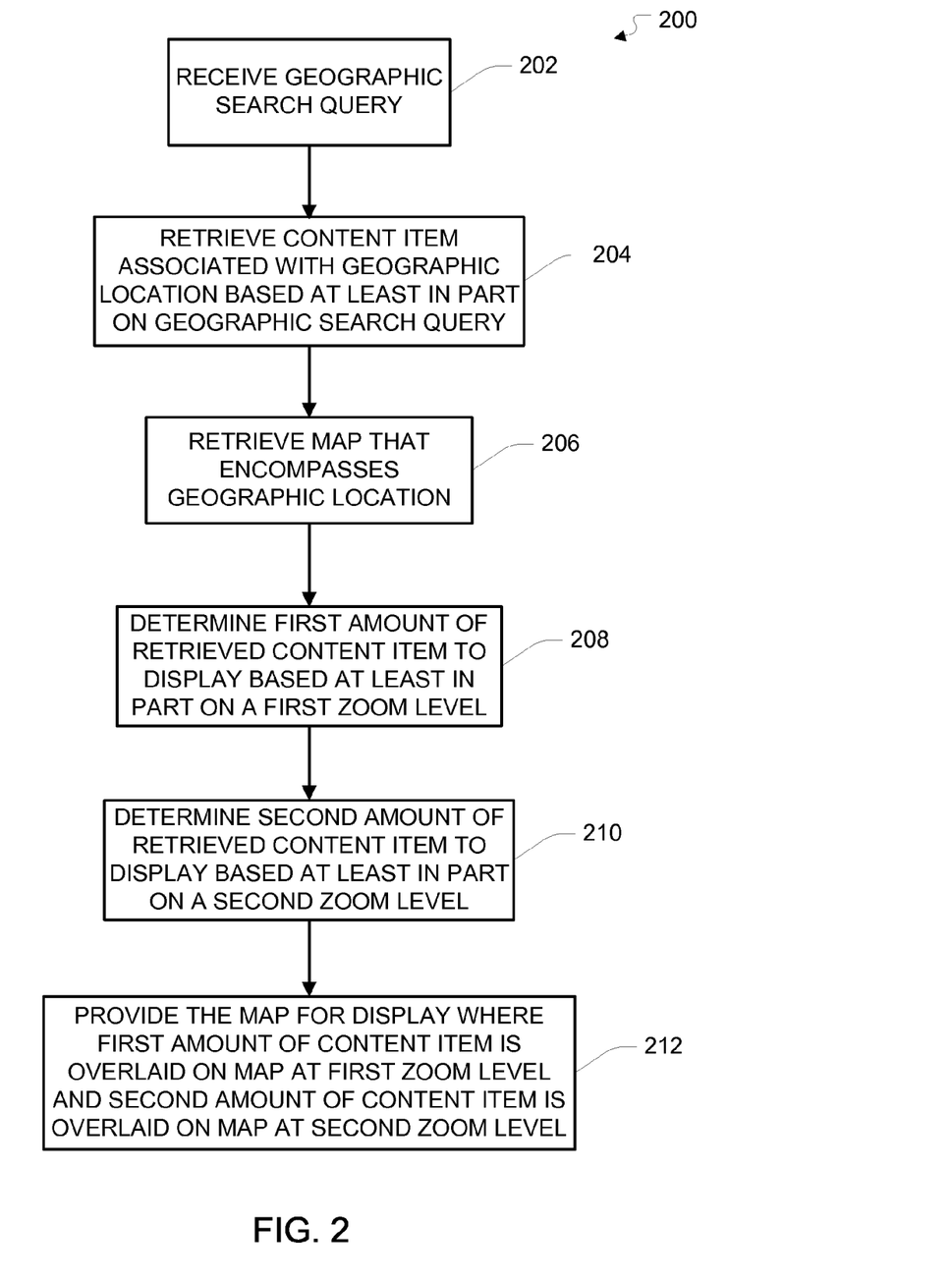
FIG. 2 illustrates a flow diagram of an example process of a system for adjusting displayed content length as a function of map scale in accordance with one or more implementations.

III. Example Processes of Systems for Adjusting Displayed Content Length as a Function of Map Scale FIG. 2 illustrates a flow diagram of example process 200 of a system for adjusting displayed content length as a function of map scale in accordance with one or more implementations. For explanatory purposes, example process 200 is described herein with reference to example network environment 100 of FIG. 1; however, example process 200 is not limited to example network environment 100 of FIG. 1. Further for explanatory purposes, the blocks of example process 200 are described herein as occurring in serial, or linearly. However, multiple blocks of example process 200 may occur in parallel. In addition, the blocks of example process 200 need not be performed in the order shown and/or one or more of the blocks of example process 200 need not be performed.

In block 202, the server 110 receives a geographic search query, such as from the electronic device 102. In block 204, the server 110 retrieves at least one content item, such as an advertisement or a search result, that is associated with a geographic location based at least in part on the received geographic search query. The content item may include text, images, video, or generally any content; however, for explanatory purposes, the content item is generally described herein as including text. In one or more implementations, the geographic location that is associated with the content item may be a geographic location of a business that is associated with the content item, such as a street address of a physical location of the business.

In block 206, the server 110 retrieves a map that encompasses the geographic location that is associated with the at least one content item and the geographic locations associated with any other retrieved content items. The server 110 may retrieve the map at an initial zoom level, e.g. the map may be zoomed in to the greatest extent possible while still encompassing the geographic location that is associated with the at least one content item and the geographic locations associated with any other retrieved content items.

In block 208, the server 110 may determine a first amount of the text of the content item to display on the map, proximal to the associated geographic location, based at least in part on a first zoom level of the map, or a first scale of the map, such as the initial zoom level of the map. The first amount of the text of the content item that is displayed on the map at the first zoom level may be less than an entire amount of the text of the content item. In one or more implementations, the first amount of text of the content item may be overlaid on the map in a content item box that is proximal to the associated geographic location. For example, the server 110 may allocate a first number of pixels of the map to the content item box for the first zoom level. The amount of text of the content item that is overlaid on the map at the first zoom level may be determined based at least in part on the number of whole words of the text of the content item that can fit within the number of pixels allocated to the content item box for the first zoom level. In other words, the text of the content item may be truncated, as necessary, at word breaks within the text of the content item. Exemplary content item boxes are discussed further below with respect to FIGS. 4-6.

In block 210, the server 110 determines a second amount of the text of the content item to display on the map based at least in part on a second zoom level of the map. For example, the amount of text of the content item that is displayed on the map may increase as the map is zoomed in from the initial zoom level until the entire amount of text of the content item is displayed on the map, or until the map is zoomed in to a maximum zoomed in level. Similarly, if the map is zoomed out, e.g. from the maximum zoomed in level, the amount of text of the content item that is displayed on the map may decrease until the map is zoomed out to the initial zoom level, at which point the amount of text of the content item that is displayed on the map may remain constant if the map is zoomed out any further. Thus, if the first zoom level is the initial zoom level and the second zoom level is a zoom level that is zoomed in from the initial zoom level, then the second amount of the text of the advertisement would be greater than the first amount of the text of the advertisement.

The server 110 may repeat blocks 208 and/or 210 to determine additional amounts of text of the content item to display for additional zoom levels for which the map may be zoomed in, or zoomed out. If the server 110 determines that an entire amount of the text of the content item will be displayed at a zoom level other than the maximum zoomed in level, then the server 110 may determine additional information associated with the content item to display as the map becomes more zoomed in. For example, if the content item is an advertisement, the additional information may include information related to the business that is associated with the advertisement, such as a name of the business, a street address of a physical location of the business, a network identifier (e.g., uniform resource locator) of the business, a phone number of the business, user review information for the business, or generally any information that is related to the business.

In one or more implementations, the server 110 may also determine a number of lines over which the text of the content item should be displayed on the map, e.g. within a content item box. For example, the server 110 may determine a multi-line zoom threshold that may fall between the initial zoom level and the maximum zoomed in level, such as approximately half-way between the initial zoom level and the maximum zoomed in level. The server 110 may determine that the text of the content item should be displayed over multiple lines, e.g. two lines, for zoom levels that are zoomed in the same amount, or zoomed in more, than the multi-line zoom threshold, while the server 110 may determine that the text of the content item should be displayed over a single line for zoom levels that are zoomed in less, e.g. zoomed out more, than the multi-line zoom threshold.

In block 212, the server 110 may provide the map and content item for display, such as to the electronic device 102, where the first amount of the content item is overlaid on the map proximal to the associated geographic location when the map is displayed at the first zoom level and the second amount of the content item is overlaid on the map proximal to the associated geographic location when the map is displayed at the second zoom level. For example, the server 110 may provide, to the electronic device 102, an indication of the amount of the text of the content item that should be overlaid on the map for each zoom level for which the map may be zoomed in, or zoomed out. The electronic device 102 may display an interface that includes the map, such as the interfaces discussed below with respect to FIGS. 4-6, and the electronic device 102 may adjust the amount of text of the content item that is overlaid on the map as the zoom level of the map changes, e.g. in accordance with the indications provided by the server 110. In one or more implementations, the code executed by the electronic device 102 to adjust the length of the displayed content item may be provided by the server 110. Alternatively, or in addition, the server 110 may provide the entire amount of the content item, without any indications of the amount of text of the content item that should be displayed at each zoom level, and the electronic device 102 may execute code provided by the server 110 to determine the amount of text of the content item to display at each zoom level, e.g. based at least in part on the amount of unoccupied map space at each zoom level. In one or more implementations, occupied map space may refer to map space that has a content item, e.g. maker, label, etc., overlaid on top, while unoccupied map space may refer to map space for which there is no overlaid content item.

Figure 3:
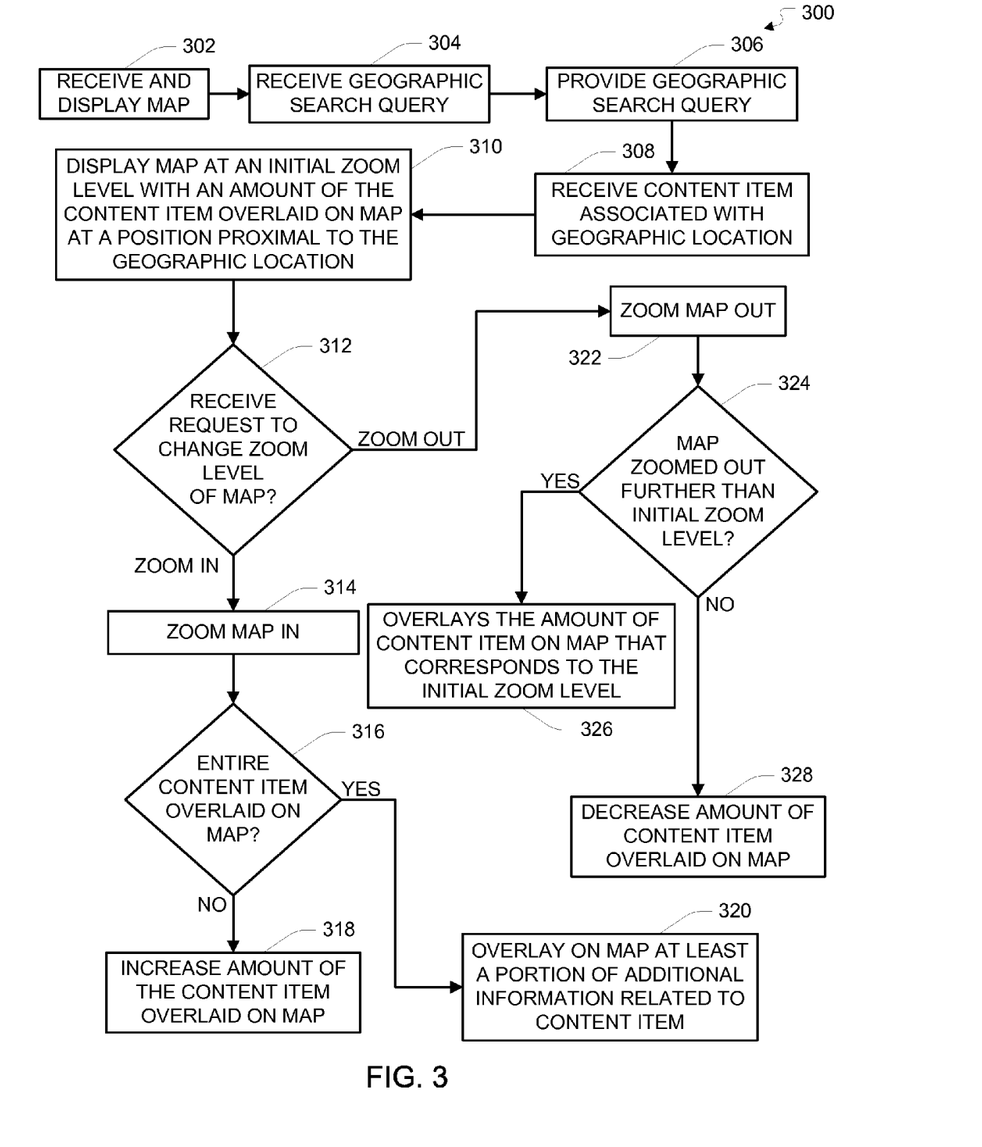
FIG. 3 illustrates a flow diagram of an example process of a system for adjusting displayed content length as a function of map scale in accordance with one or more implementations.

FIG. 3 illustrates a flow diagram of example process 300 of a system for adjusting displayed content length as a function of map scale in accordance with one or more implementations. For explanatory purposes, example process 300 is described herein with reference to example network environment 100 of FIG. 1; however, example process 300 is not limited to example network environment 100 of FIG. 1. Further for explanatory purposes, the blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed.

In block 302, the electronic device 102 receives and displays a map, such as a map that is received from the server 110 over the network 108. In block 304, the electronic device 102 may receive a geographic search query, such as from a user that is interacting with the electronic device 102. In block 306, the electronic device 102 may provide the geographic search query to the server 110, such as over the network 108. In block 308, the electronic device 102 receives an entire amount of a content item that is associated with a geographic location, such as an entire amount of text of a content item. The content item may be, e.g. a search result or an advertisement, that is associated with a geographic location. For example, the server 110 may retrieve a search result or an advertisement that is associated with a geographic location, e.g. based at least in part on the geographic search query, and the server 110 may provide the entire text of the search result and/or the entire text of the advertisement to the electronic device 102.

In block 310, the electronic device 102 displays the received map at an initial zoom level along with an amount of text of the content item overlaid on the map at a position that is proximal to the associated geographic location. The amount text of the content item that is overlaid on the map may be determined by the server 110, e.g. based at least in part on the initial zoom level, and communicated to the electronic device 102. Alternatively, or in addition, the electronic device 102 may determine the amount of text of the content item to display at the initial zoom level irrespective of the initial zoom level, e.g. based at least in part on the amount of space on the map that is not occupied by other content items.

In block 312, the electronic device 102 determines whether a request has been received to change the zoom level, e.g. to zoom in or zoom out from the initial zoom level. For example, a user may interact with controls provided by the electronic device 102, and/or a human interface device of the electronic device 102, such as a touchscreen, to request a change of the zoom level of the map. If, in block 312, the electronic device 102 receives a request to zoom out, the electronic device 102 moves to block 322. In block 322, the electronic device 102 zooms the map out. For example, the electronic device 102 may perform the zooming out based on information previously received from the server 110, and/or the electronic device 102 may request a zoomed out version of the map from the server 110. In block 324, the electronic device 102 determines whether the map is zoomed out further than the initial zoom level.

If, in block 324, the electronic device 102 determines that the map is not zoomed out further than the initial zoom level, then the electronic device 102 moves to block 328. In block 328, the electronic device 102 decreases the amount of the content item that is overlaid on the map. For example, the electronic device 102 may decrease the amount of text of the content item that is overlaid on the map, e.g. the amount of text of the content item that is visible to a user. If, in block 324, the electronic device 102 determines that the map is zoomed out further than the initial zoom level, then the electronic device 102 moves to block 326. In block 326, the electronic device 102 overlays the amount of the content item on the map that corresponds to the initial zoom level, e.g. the amount of the content item that was overlaid on the map at the initial zoom level at block 310.

If, in block 312, the electronic device 102 determines that a request was received to zoom the map in, the electronic device 102 moves to block 314. In block 314, the electronic device 102 zooms the map in. For example, the electronic device 102 may perform the zooming in based on information previously received from the server 110, and/or the electronic device 102 may request a zoomed in version of the map from the server 110. In block 316, the electronic device 102 determines whether the entire content item is overlaid on the map, e.g. whether the entire text of the content item is being displayed. If, in block 316, the electronic device 102 determines that the entire content item is being overlaid on the map, the electronic device 102 moves to block 320. In block 320, the electronic device 102 overlays on the map the entire content item, and at least a portion of additional information related to the content item, such as information corresponding to a business that is associated with the content item. If, in block 316, the electronic device 102 determines that the entire content item is not overlaid on the map, the electronic device 102 moves to block 318. In block 318, the electronic device 102 increases the amount of the content item that is overlaid on the map, e.g. the electronic device 102 increases the amount of text of the content item that is overlaid on the map. The electronic device 102 may repeat steps 312-328, as necessary, e.g. as a user zooms in and zooms out of the map.

Although the blocks of FIG. 3 are discussed herein as being performed by the electronic device 102, in one or more implementations, the electronic device may receive code for performing the blocks of FIG. 3 from the server 110. For example, the server 110 may provide code to the electronic device 102, that when executed by the electronic device 102, causes the electronic device to increase the amount of the content item that is overlaid on the map when the map is zoomed in, e.g. block 318, and/or decrease the amount of the content item that is overlaid on the map when the map is zoomed out, e.g. block 328. Generally, any of the blocks of FIG. 3 that are performed by the electronic device 102 may be performed by the electronic device 102 by executing code that is provided by the server 110.

Figure 4:
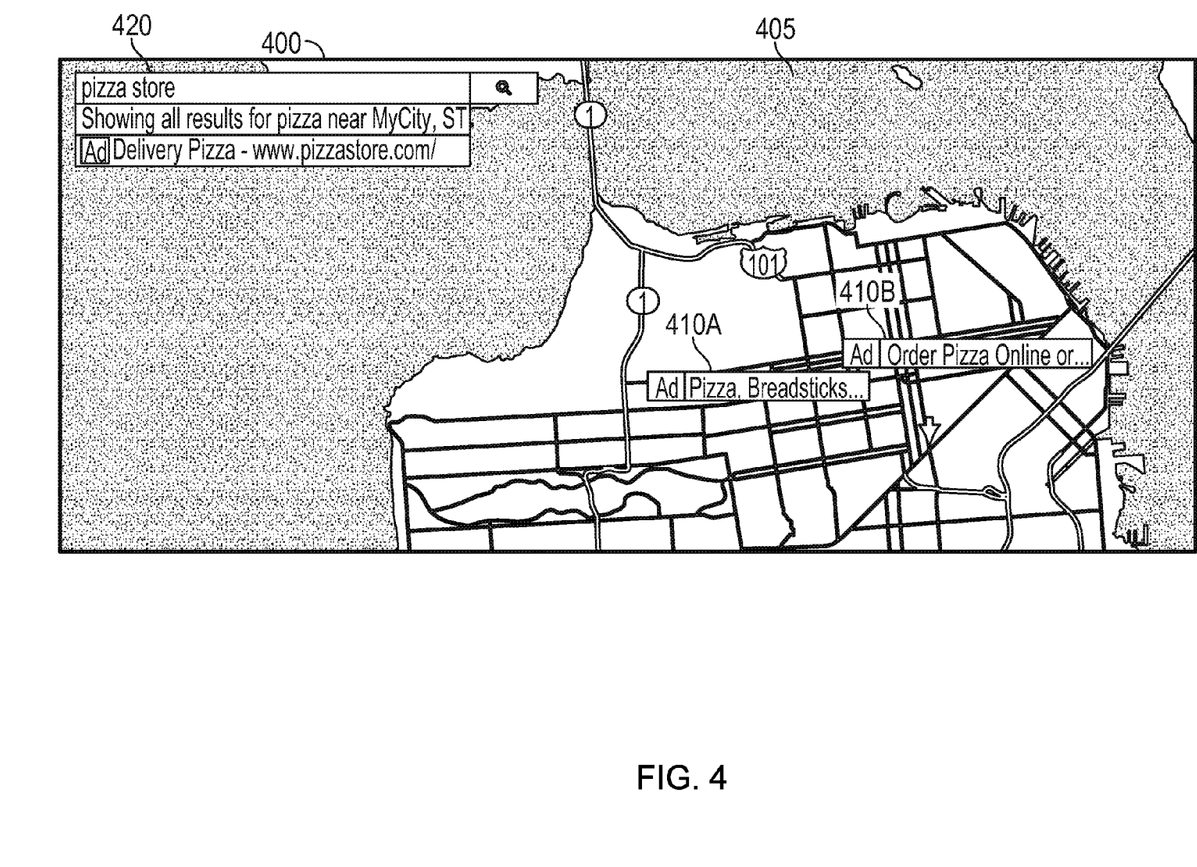
FIG. 4 illustrates an example user interface of a system for adjusting displayed content length as a function of map scale in accordance with one or more implementations.

IV. Example User Interfaces of Systems for Adjusting Displayed Content Length as a Function of Map Scale FIG. 4 illustrates an example user interface 400 of a system for adjusting displayed content length as a function of map scale in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 400 includes a map 405, content item boxes 410A-B, and a query field 420. The map 405 of the user interface 400 may be provided at an initial zoom level, e.g. in response to a user entering a geographic search query for "pizza store" into the query field 420 of the user interface 400. For example, the electronic device 102 may transmit the geographic search query to the server 110, the server 110 may retrieve entire content items based at least in part on the geographic search query, and the server 110 may provide the entire content items, the map 405 at the initial zoom level, and/or content item boxes 410A-B to the electronic device 102. In one or more implementations, the server 110 may also provide the electronic device 102 with an indication of amounts of the content items that should be overlaid in the content item boxes 410A-B on the map 405 at each zoom level for which the map 405 can be zoomed to, e.g. the server 110 may indicate that first amounts of the content items should be overlaid in the content item boxes 410A-B on the map 405 when the map 405 is zoomed to the initial zoom level. The electronic device 102 may then overlay the first amounts of the content items in the content item boxes 410A-B on the map, e.g. proximal to the associated geographic locations, as indicated by the server 110 for the initial zoom level.

Alternatively, or in addition, the server 110 may provide the entire amount of the content items to the electronic device 102 and the electronic device 102 may determine the amounts of the content items to be overlaid in the content item boxes 410A-B on the map 405 at each zoom level, such as the first amount of the content items when the map 405 is zoomed at the initial zoom level. The electronic device 102 may provide controls, such as a control overlaid on the user interface 400, or a human interface device, such as a touchscreen, to allow the user to request a change of the zoom level of the map 405.

Figure 5:
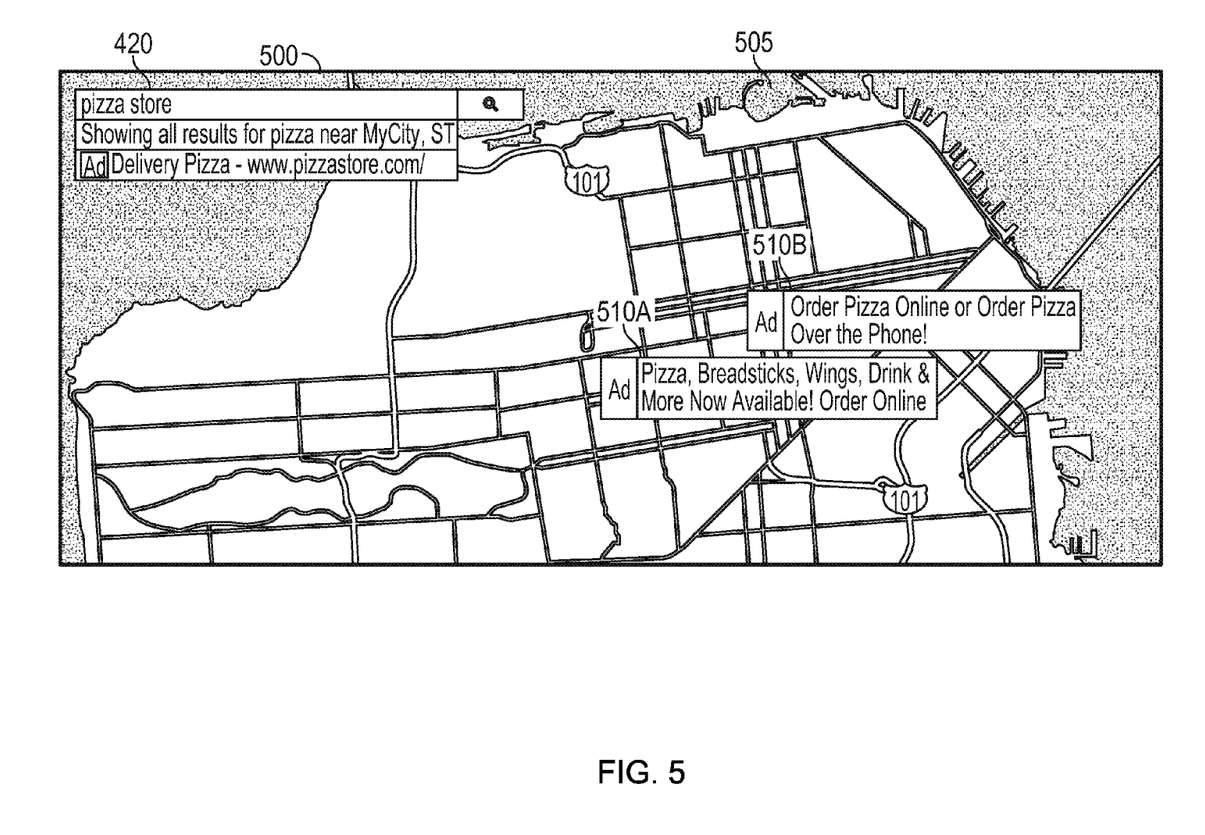
FIG. 5 illustrates an example user interface of a system for adjusting displayed content length as a function of map scale in accordance with one or more implementations.

FIG. 5 illustrates an example user interface 500 of a system for adjusting displayed content length as a function of map scale in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 500 may include a map 505, content item boxes 510A-B, and the query field 420. The user interface 500 may be displayed in response to receiving a request to zoom in to the map 405 of FIG. 4. For example, a user may interact with human interface device, e.g. a touchscreen, of the electronic device 102 to request to zoom in on the map 405 of FIG. 4. In response to the user request, the electronic device 102 may zoom in the map 405 of the FIG. 4 by displaying the map 505 of FIG. 5. The electronic device 102 may also determine second amounts of the content items to overlay in the content item boxes 510A-B for the zoom level of the map 505. For example, the electronic device 102 may receive an indication of the second amounts of the content items to overlay on the map 505 in the content item boxes 510A-B from the server 110, or the electronic device 102 may determine the second amounts of the content items to overlay on the map 505 in the content item boxes 510A-B, such as based at least in part on the amount of available space on the map 505. As shown in the user interface 500, the second amounts of the content items that are overlaid on the map 505 in the content item boxes 510A-B includes the entire amount of the content items, which is greater than the first amounts of the content items that are overlaid on the map 405 in the content item boxes 410A-B. Also as shown in FIGS. 4 and 5, the texts of the content items that are overlaid in the content item boxes 410A-B are subsets of the texts of the content items that are overlaid in the content item boxes 510A-B.

Figure 6:
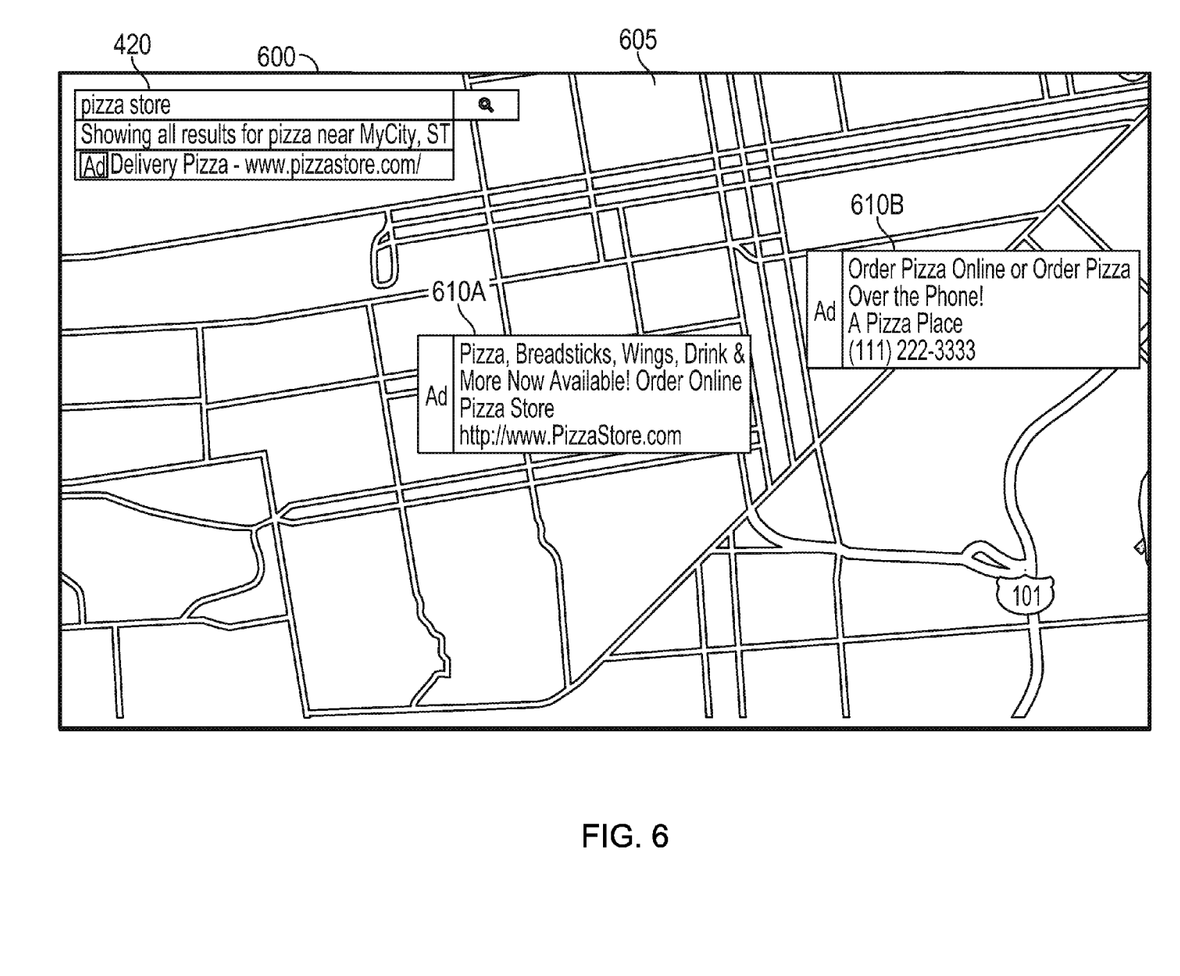
FIG. 6 illustrates an example user interface of a system for adjusting displayed content length as a function of map scale in accordance with one or more implementations.

FIG. 6 illustrates an example user interface 600 of a system for adjusting displayed content length as a function of map scale in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 600 may include a map 605, content item boxes 610A-B, and the query field 420. The user interface 600 may be displayed in response to receiving a request to zoom in to the map 505 of FIG. 5. For example, a user may interact with a human interface device, such as a touchscreen, of the electronic device 102 to request to zoom in on the map 505 of FIG. 5. In response to the user request, the electronic device 102 may zoom in on the map 505 of the FIG. 5 by displaying the map 605 of FIG. 6. The electronic device 102 may also determine third amounts of the content items to overlay in the content item boxes 610A-B for the zoom level of the map 605. However, since the map 605 is zoomed in from the map 505, and since the entire amounts of the content items are overlaid in the content item boxes 510A-B of FIG. 5, the electronic device 102 may overlay additional information related to businesses that are associated with the content items in the content item boxes 610A-B, in addition to the entire amounts of the content items. For example, the electronic device 102 may determine the names of the associated businesses, URLs of the associated businesses, telephone numbers of the associated businesses, or generally any information related to the associated businesses. As shown in FIG. 6, the name and URL of the associated business is overlaid in the content item box 610A (in addition to the entire content item), and the name and telephone number of the associated business is overlaid in the content item box 610B (in addition to the entire content item).

V. Example Systems for Adjusting Displayed Content Length as a Function of Map Scale FIG. 7 conceptually illustrates electronic system 700 with which any implementations of the subject technology may be implemented. Electronic system 700, for example, can be a desktop computer, a laptop computer, a tablet computer, a server, a switch, a router, a base station, a receiver, a phone, a personal digital assistant (PDA), or generally any electronic device that transmits signals over a network. Such an electronic system includes various types of computer readable media and interfaces for various other types of computer readable media. Electronic system 700 includes bus 708, processing unit(s) 712, system memory 704, read-only memory (ROM) 710, permanent storage device 702, input device interface 714, output device interface 706, and network interface 716, or subsets and variations thereof.

Figure 7:
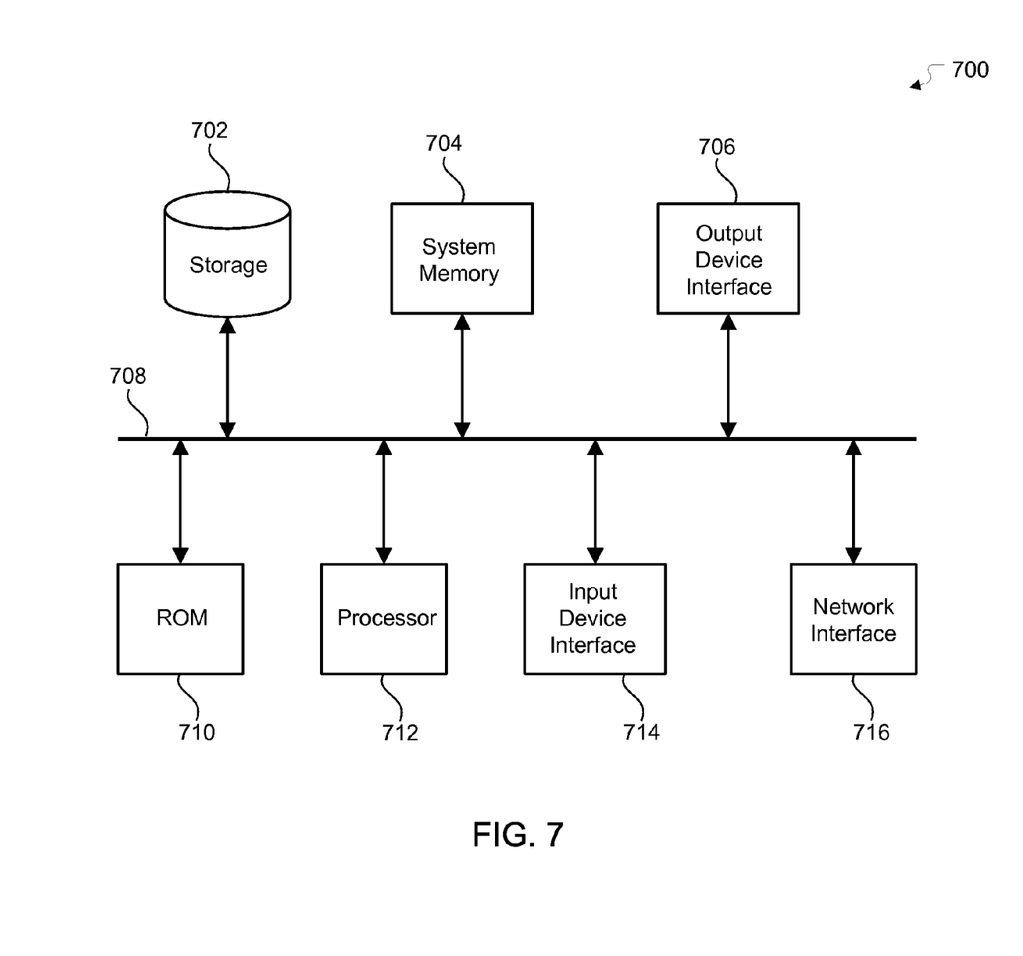
FIG. 7 conceptually illustrates an electronic system with which one or more implementations of the subject technology may be implemented.

Bus 708 collectively represents all system, peripheral, and chipset buses that communicatively connect the numerous internal devices of electronic system 700. In one or more implementations, bus 708 communicatively connects processing unit(s) 712 with ROM 710, system memory 704, and permanent storage device 702. From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. One or more implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as random access memory. System memory 704 stores any of the instructions and data that processing unit(s) 712 needs at runtime. In one or more implementations, the processes of the subject disclosure are stored in system memory 704, permanent storage device 702, and/or ROM 710. From these various memory units, processing unit(s) 712 retrieves instructions to execute and data to process in order to execute the processes of one or more implementations.

Bus 708 also connects to input and output device interfaces 714 and 706. Input device interface 714 enables a user to communicate information and select commands to the electronic system. Input devices used with input device interface 714 include, for example, alphanumeric keyboards and pointing devices (also called "cursor control devices"). Output device interface 706 enables, for example, the display of images generated by electronic system 700. Output devices used with output device interface 706 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, bus 708 also couples electronic system 700 to a network (not shown) through network interface 716. In this manner, the computer can be a part of a network of computers (such as a local area network ("LAN"), a wide area network ("WAN"), or an Intranet, or a network of networks, such as the Internet. Any or all components of electronic system 700 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer-implemented method for adjusting displayed content length as a function of map scale, the method comprising:
    receiving, using one or more computing devices, a query from a user device;
    retrieving, using the one or more computing devices, a content item based at least in part on the query;
    determining, using the one or more computing devices, a first amount of the retrieved content item to display on a map based at least in part on a first amount of space available on the map when the map is displayed at a first zoom level;
    determining, using the one or more computing devices, a second amount of the retrieved content item to display on the map based at least in part on a second amount of space available on the map when the map is displayed at a second zoom level, wherein the second zoom level is unequal to the first zoom level, and the second amount of the content item is a subset or a superset of the first amount of the content item; and
    providing, using the one or more computing devices and to the user device, the map for display, wherein the first amount of the content item is overlaid on the map when the map is displayed at the first zoom level and the second amount of the content item is overlaid on the map when the map is displayed at the second zoom level.

2. The method of claim 1, further comprising:
    determining an initial amount of the content item to be displayed at an initial zoom level, wherein the initial amount of the content item is overlaid on the map when the map is displayed at the initial zoom level.

3. The method of claim 1, wherein the content item comprises an advertisement that is associated with a geographic location and the first amount of the advertisement is overlaid on the map at a position that is proximal to the geographic location.

4. The method of claim 3, wherein the second zoom level is zoomed in more than the first zoom level and the second amount of the advertisement is greater than the first amount of the advertisement.

5. The method of claim 4, wherein the advertisement comprises text and the first amount of the text of the advertisement is overlaid on the map when the map is displayed at a third zoom level that is zoomed out more than the first zoom level.

6. The method of claim 5, wherein the first amount of the text of the advertisement is displayed on a single line when the map is displayed at the first zoom level and the second amount of the text of the advertisement is displayed across multiple lines when the map is displayed at the second zoom level, the second zoom level being between the first zoom level and a maximum zoomed in level.

7. The method of claim 6, wherein an entire amount of the text of the advertisement is displayed at the maximum zoomed in level.

8. The method of claim 4, wherein the advertisement comprises text, the first amount of the text of the advertisement is less than an entire amount of the text of the advertisement, and the second amount of the text of the advertisement comprises the entire amount of the text of the advertisement.

9. The method of claim 8, wherein the entire amount of the text of the advertisement, and at least a portion of an information item that is related to a business associated with the advertisement, are overlaid on the map when the map is displayed at a third zoom level that is zoomed in more than the second zoom level.

10. A computer-implemented method for adjusting displayed content length as a function of map scale, the method comprising:
receiving, using one or more computing devices, a geographic search query;
retrieving, using the one or more computing devices, an advertisement and a map both being retrieved based at least in part on the geographic search query, wherein the advertisement is associated with a geographic location that is encompassed by the map, and the advertisement comprises text;
determining, using the one or more computing devices, an amount of the text of the advertisement to display based at least in part on a zoom level of the map, wherein the amount of the text of the advertisement to display is dependent upon an amount of unoccupied space on the map at the zoom level such that the amount of the text of the advertisement to display increases proportionally to zooming in on the map until an entire amount of the text of the advertisement is displayed or a maximum zoomed in level is reached and the amount of the text of the advertisement to display is a subset of the entire amount of the text of the advertisement for at least one zoom level that is less than the maximum zoomed in level; and
providing, using the one or more computing devices, a map that includes the determined amount of the text of the advertisement overlaid on the map at a position that is proximal to the geographic location associated with the advertisement.

11. The method of claim 10, wherein the amount of the text of the advertisement to display decreases proportionally to zooming out on the map.

12. The method of claim 11, wherein the map is provided at an initial zoom level and the amount of the text of the advertisement displayed on the map remains constant when the map is zoomed out from the initial zoom level.

13. The method of claim 10, wherein the unoccupied space on the map is exclusive of overlaid content items.

14. A system, comprising:
one or more computing devices; and
a memory including instructions that, when executed by the one or more computing devices, cause the one or more computing devices to:
receive a query;
retrieve an advertisement based at least in part on the query, wherein the advertisement is associated with a geographic location and the advertisement comprises text; and
provide an interactive map interface, the interactive map interface displaying:
a map that comprises a geographic area that encompasses the geographic location, wherein an amount of the advertisement is overlaid on the map at a position that is proximal to the geographic location,
wherein the interactive map interface is configured to change a first scale of the map, irrespective of a second scale of the interactive map interface, in response to a user interaction with the interactive map interface and change the amount of the advertisement that is displayed on the map as a function of the first scale of the map irrespective of the second scale of the interactive map interface and in response to the user interaction with the interactive map interface, the amount of the advertisement that is displayed for at least one scale being a subset of a maximum amount of the advertisement that is displayed for a maximum scale.

15. The system of claim 14, wherein the interactive map interface further displays a query field, display of the query field being affected by changes in the second scale of the interactive map interface but unaffected by changes in the first scale of the map, and the interactive map interface being further configured to increase the amount of the advertisement that is displayed on the map as the first scale of the map decreases.

16. The system of claim 15, wherein the interactive map interface is further configured to decrease the amount of the advertisement that is displayed on the map as the first scale of the map increases and while the first scale of the map is less than an initial scale of the map.

17. The system of claim 16, wherein the interactive map interface is further configured to maintain the amount of the advertisement that is displayed on the map for the initial scale of the map when the first scale of the map is greater than the initial scale of the map.

18. A non-transitory machine readable medium embodying instructions that, when executed by a machine, cause the machine to perform a method for adjusting a length of displayed content as a function of map scale, the method comprising:
receiving a search query;
retrieving an advertisement and a map based at least in part on the search query, wherein the advertisement is associated with a geographic location that is encompassed by the map and the advertisement comprises text;
determining a number of pixels of the map that are allocated to an advertisement box as a first function of a zoom level of the map;
determining an amount of text of the advertisement to overlay on the map as a second function of the number of pixels of the map that are allocated to the advertisement box, wherein the amount of the text of the advertisement to overlay on the map for at least one zoom level is a subset of a maximum amount of the text of the advertisement that is overlaid on the map for a maximum zoom level; and
providing the map for display, wherein the determined number of pixels of the map comprises the advertisement box and the advertisement box comprises the determined amount of the text of the advertisement.

19. The non-transitory machine readable medium of claim 18, wherein the number of pixels of the map that are allocated to the advertisement box increases when the map is zoomed in, the number of pixels of the map that are allocated to the advertisement box decreases as the map is zoomed out and while the zoom level of the map is greater than or equal to an initial zoom level, and the number of pixels of the map that are allocated to the advertisement box remains constant when the map is zoomed out from the initial zoom level.

20. The non-transitory machine readable medium of claim 19, wherein the amount of the text of the advertisement that is displayed in the advertisement box is determined based at least in part on a number of words of the text of the advertisement that can fit in their entirety within the number of pixels of the map that are allocated to the advertisement box.

* * * * *